United States Patent
Katsevich et al.

(10) Patent No.: US 8,611,630 B1
(45) Date of Patent: Dec. 17, 2013

(54) ALGORITHM FOR MOTION ESTIMATION FROM THE TOMOGRAPHIC DATA

(75) Inventors: Alexander Katsevich, Oviedo, FL (US); Michael D. Silver, Northbrook, IL (US); Alexander Zamyatin, Hawthorn Woods, IL (US)

(73) Assignees: University of Central Florida Research Foundation, Inc., Orlando, FL (US); Toshiba Medical Research Institute USA, Vernon Hills, IL (US)

( * ) Notice: Subject to any disclaimer, the term of this patent is extended or adjusted under 35 U.S.C. 154(b) by 202 days.

(21) Appl. No.: 13/152,997

(22) Filed: Jun. 3, 2011

Related U.S. Application Data

(60) Provisional application No. 61/351,614, filed on Jun. 4, 2010.

(51) Int. Cl.
*G06K 9/00* (2006.01)

(52) U.S. Cl.
USPC .......................................... 382/131

(58) Field of Classification Search
USPC .................... 382/128–134; 128/920–925; 356/39–49; 600/407–414, 424–426; 345/581–618
See application file for complete search history.

(56) References Cited

U.S. PATENT DOCUMENTS

2007/0076928 A1*  4/2007  Claus et al. ................... 382/128

OTHER PUBLICATIONS

Anastasio, et al., Local Cone-Beam Tomography Image Reconstruction on Chords, J. Opt. Soc. Amer. 2007, pp. 1569-1579, vol. 24, abstract.

Blondel, et al., Reconstruction of Coronary Arteries from a Single Rotational X-Ray Projection Sequence, IEEE Trans. Med. Imaging, 2006, pp. 653-663, No. 25, abstract.
Blondel, et al., 3D Tomographic Reconstruction of Coronary Arteries Using a Precomputed 4D Motion Field, Phys. Med. Biol., 2004, pp. 2197-2208, vol. 49, abstract.
Bonnet, et al., Dynamic X-Ray Computed Tomography, Proc. IEEE, 2003, pp. 1574-1587, vol. 91, abstract.
Bontus, et al. CEnPiT: Helical Cardiac CT Reconstruction, Med. Phys., 2006, pp. 2792-2799, vol. 33, abstract.
Desbat, et al, Compensation of Some Time Dependent Deformations in Tomography, IEEE Trans. Med. Imaging, 2007, pp. 261-26-, vol. 26, abstract.
Flohr, et al., Heart Rate Adaptive Optimization of Spatial and Temporal Resolution for Electrocardiogram-Gated Multislice Spiral Ct of the Heart, J. Comput. Assist. Tomogr., 2001, pp. 907-923, vol. 25, abstract.
Grangeat, et al., Theoretical Framework for a Dynamic Cone-Beam Reconstruction Algorithm Based on a Dynamic Particle Model, Phys. Med. Biol., 2002, pp. 2611-2625, vol. 47, abstract.
Grass, et al., Helical Cardiac Cone Beam Reconstruction Using Retrospective ECG Gating, Phys. Med. Biol. 2003, pp. 3069, vol. 48, No. 18, abstract.
Kachelriess, et al., ECG-Correlated Imaging of the Heart with Subsecond Multislice Spiral CT, IEEE Explore, 2000, pp. 888-901, vol. 19, abstract.

(Continued)

*Primary Examiner* — Atiba O Fitzpatrick
(74) *Attorney, Agent, or Firm* — Molly Sauter

(57) ABSTRACT

The methods and systems of the present invention is an algorithm which estimates motion inside objects that change during the scan. The algorithm is flexible and can be used for solving the misalignment correction problem and, more generally, for finding scan parameters that are not accurately known. The algorithm is based on Local Tomography so it is faster and is not limited to a source trajectory for which accurate and efficient inversion formulas exist.

7 Claims, 8 Drawing Sheets

(56) References Cited

OTHER PUBLICATIONS

Katsevich, Improved Cone Beam Local Tomography, Inverse Problems, 2006, pp. 627-643, vol. 22, No. 2, abstract.

Katsevich, Motion Compensated Local Tomography, Inverse Problems, 2008, pp. 1-21, vol. 24.

Koken, et al., Aperture Weighted Cardiac Reconstruction for Cone-Beam CT, Phys. Med. Biol, 2006, pp. 1, vol. 51, No. 14, abstract.

Kyriakou, et al, Simultaneous Misalignment Correction for Approximate Circular Cone-Beam Computed Tomography, Phys. Med. Biol., 2008, pp. 6267-6289, vol. 53.

Lauritsch, et al, Towards Cardiac C-Arm Computed Tomography, Medical Imaging, 2006, pp. 922-934, vol. 25, No. 7, abstract.

Louis, et al., Contour Reconstruction in 3-D X-Ray CT, Medical Imaging, 1993, pp. 764-769, vol. 12, No. 4, abstract.

Nelder, et al., A Simplex Method for Function Minimization, National Vegetable Research Station, 1965, pp. 308-314.

Pack, et al., Dynamic Computed Tomography with Known Motion Field, Proc. SPIE, 2004, pp. 5370, vol. 2097, abstract.

Quinto, et al., Local Tomography in Electron Microscopy, J. Appl. Math, pp. 1282-1303, vol. 68, No. 5.

Reyes, et al., Model-Based Respiratory Motion Compensation for Emission Tomography Image Reconstruction, Physics in Medicine and Biology, pp. 3579, vol. 52, No. 12, abstract.

Rit, et al., Comparison of Analytic and Algebraic Methods for Motion-Compensated Cone-Beam CT Reconstruction of the Thorax, Medical Imaging, pp. 1513-1525, vol. 28, No. 10, abstract.

Schweikard, et al., Respiration Tracking in Radiosurgery without Fiducials, The International Journal of Medical Robotics and Computer Assisted Surgery, 2005, pp. 19-27, vol. 1, issue 2, abstract.

Shen, et al., Consistent Estimation of Cardiac Motions by 4D Image Registration, Lecture Notes in Comp. Science, 2005, pp. 902-910, vol. 3750, No. 2005, abstract.

Wierzbicki, et al, Dose Reduction for Cardiac CT Using a Registration-Based Approach, Med. Phys., 2007, pp. 1884-1895, vol. 34, No. 6.

Ye, et al., Cone-Beam Pseudo-Lambda Tomography, Inverse Problems, pp. 203, vol. 23, No. 1, abstract.

Zeng, et al., Respiratory Motion Estimation from Slowly Rotating X-Ray Projections: Theory and Simulation, Medical Physics, 2005, 8 pages, vol. 32, abstract.

Zeng, et al., Estimating 3-D Respiratory Motion from Orbiting Views by Tomographic Image Registration, Medical Imaging, pp. 153-163, vol. 26, No. 2, abstract.

\* cited by examiner

Fig. 3a 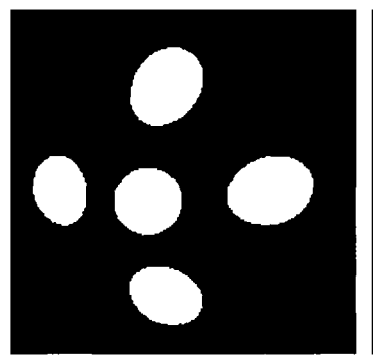 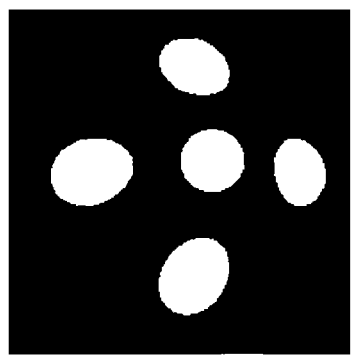 Fig. 3b
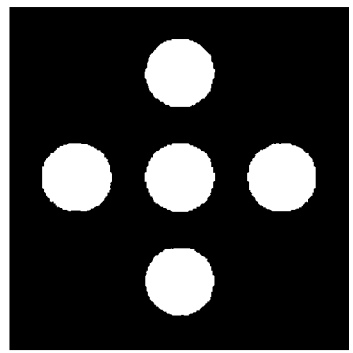
Fig. 3c

Fig. 4a 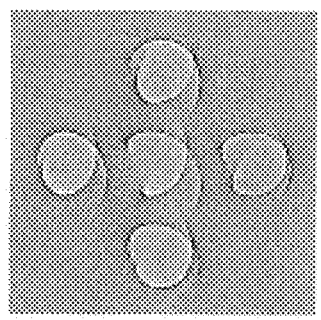 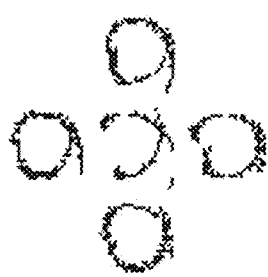 Fig. 4b
Fig. 4c 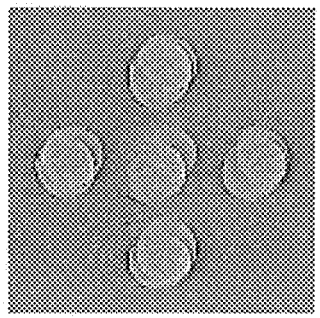 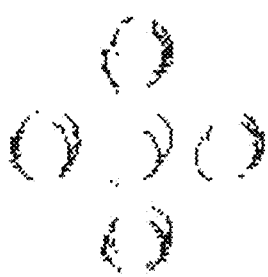 Fig. 4d
Fig. 4e 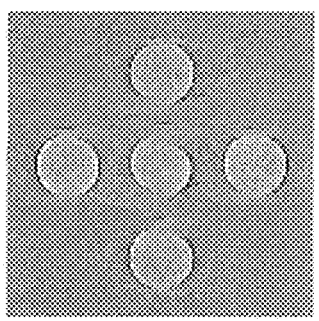 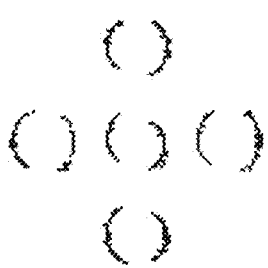 Fig. 4f

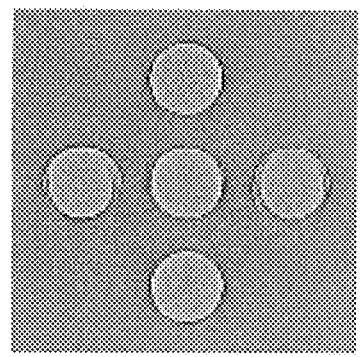 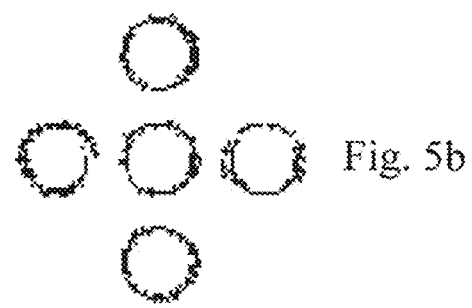
Fig. 5a    Fig. 5b
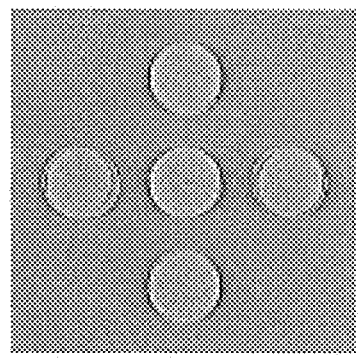 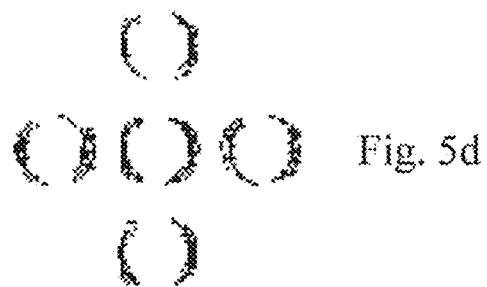
Fig. 5c    Fig. 5d
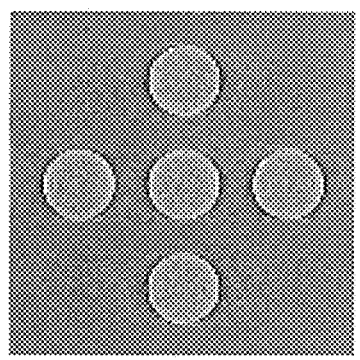 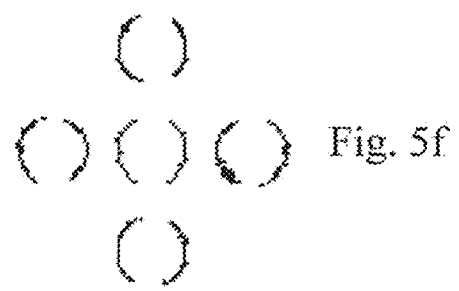
Fig. 5e    Fig. 5f Fig. 7a 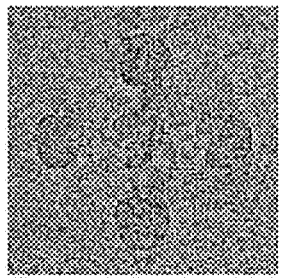 Fig. 7b  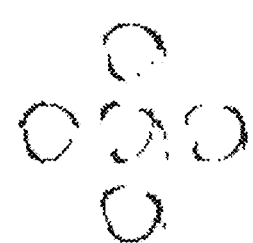 Fig. 7c
Fig. 7d 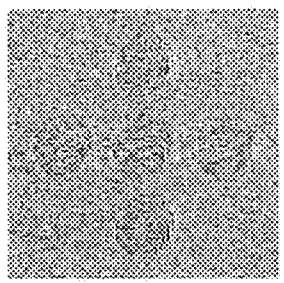  Fig. 7e 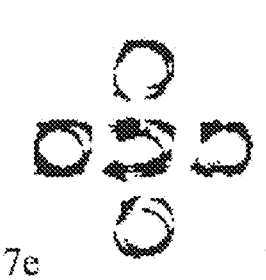 Fig. 7f
Fig. 7g 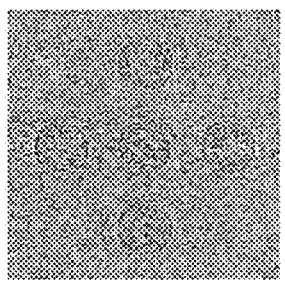  Fig. 7i 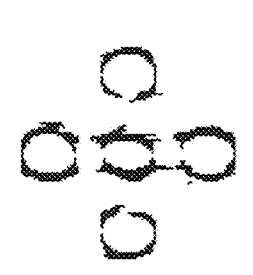
Fig. 7h

ALGORITHM FOR MOTION ESTIMATION FROM THE TOMOGRAPHIC DATA

This application claims the benefit of priority to U.S. Provisional Application No. 61/351,614 filed on Jun. 4, 2010, which is incorporated by reference in its' entirety.

FIELD OF THE INVENTION

This invention relates to tomography and, in particular, to methods, systems and devices for tomography with motion estimation for reconstructing objects that change during the scan and misalignment correction for reconstructing objects when some scan parameters are not accurately known.

BACKGROUND AND PRIOR ART

Cardiac and, more generally, dynamic imaging is one of the top challenges facing modem computed tomography. When the object being scanned changes during data acquisition the classic tomographic reconstruction theory does not apply. In cardiac computed tomography there are two major groups of approaches for dealing with this issue. One is based on gating, i.e., selecting the computed tomography data which correspond to a fixed cardiac phase, and then using mostly that data for image reconstruction. The second approach, known as motion compensation, is based on incorporating a motion model into a reconstruction algorithm. Motion compensation algorithms are preferable, because they use all data and have the potential to provide good image quality with reduced x-ray dose. The main difficulty of using such algorithms is that the motion model needs to be known. There are motion estimation algorithms available, but significant research still needs to be done to improve efficiency, accuracy, and stability with respect to noise, flexibility, and the like.

The methods and systems of the present invention solve the problems associated with the prior art using a novel approach to motion estimation, which is based on local tomography (LT). The ultimate goal is a robust algorithm which can reconstruct objects that change during the scan. Since there is no formula that recovers the object f and motion function $\psi$ from the tomographic data, the most realistic approach to finding f and $\psi$ is via iterations. On the other hand, recovering both of them at the same time would result in an iterative problem of a prohibitively large size.

The best approach is to decouple the two tasks, motion estimation and motion compensation, as much as possible. Not all methods achieve this goal. For example, when finding $\psi$ using registration, one uses the images of f at different times. In other words, finding $\psi$ depends on the knowledge of f. This has undesirable consequences. When motion is not known, f is reconstructed with significant artifacts, making subsequent registration unreliable and inaccurate. In contrast, LT is an ideal candidate for decoupling. LT does not reconstruct pointwise values of f, but rather a gradient-like image of f with edges enhanced. Thus the only informative feature of LT is the location of edges.

SUMMARY OF THE INVENTION

A first objective is an algorithm for motion estimation from tomographic data that can be used for improved image reconstruction from CT data in the case when there is motion in the object (e.g., cardiac motion or breathing motion) during the scan.

A second objective is an algorithm for estimating scan parameters from tomographic data that can be used for correcting for the imperfections in the x-ray source trajectory or other scan parameters such as misalignment and the like.

The methods and systems of the present invention show that when any given edge is seen from the data from two or more source positions, then in the case of incorrectly known motion, the single edge "spreads" and becomes a double edge. As a result, the image looks more cluttered. A solution to the problems associated with the prior art is to iteratively improve the motion model so that image clutter is minimized. The present invention provides an empiric measure of clutter, referred to "edge entropy." Note that the word "entropy" in the name is largely symbolic, since the present invention does not establish any properties that conventional entropy must possess. In the present invention motion estimation is completely independent of the knowledge of f, and the desired decoupling is achieved. No knowledge of f is required. The only thing needed is that f possess a sufficient number of edges, which is true for practically all f occurring in medical imaging. The use of LT has other benefits as well.

1. LT is very fast. First, it does not require global filtering. Second, backprojection is greatly simplified, since there is no need to compute complicated weights that are mandatory for quasi-exact motion compensating inversion formulas. The weights compensate for variable length of illumination for every voxel in an image. Clearly, high reconstruction speed is critically important for iterative-based motion estimation.

2. LT uses only local data; hence it is not sensitive to data truncation.

3. LT is very flexible and can be used with practically any source trajectory.

Let us mention some other attractive features of the present invention. First, it is local in time. Motion estimation is done inside a reasonably short time window, e.g., not much longer than the length of a short scan. This eliminates the need for making the periodicity assumption as described in S. Bonnet, A. Koenig, S. Roux, P. Hugonnard, R. Guillemaud, and P. Grangeat, Dynamic X-ray computed tomography, Proc. IEEE, 91 (2003), pp. 1574-1587, which frequently holds only approximately. Second, the approach is fairly general and can be used for several types of motion, e.g., cardiac, breathing, etc. Finally, with simple modifications the approach can be applied to solving other practically important problems. As an example we show how to solve a misalignment correction problem for a distorted circular scan. A similar iterative algorithm, which is based on the Feldkamp inversion formula, is described in Y. Kyriakou, et al., Simultaneous misalignment correction for approximate circular cone-beam computed tomography, Phys. Med. Biol., 53 (2008), pp. 6267-6289.

Since the algorithm of the present invention is based on LT, it is faster and is not limited to a source trajectory for which accurate and efficient inversion formulas exist. As before, estimation of the unknown source trajectory is completely decoupled from finding f, so for the latter purpose one can use any algorithm. For example, when the data are truncated, one might want to use an iterative reconstruction algorithm. If the two problems are coupled, using an iterative algorithm for finding f inside an iterative algorithm for estimating the source trajectory is prohibitively slow.

Further objects and advantages of this invention will be apparent from the following detailed description of preferred embodiments which are illustrated schematically in the accompanying drawings.

BRIEF DESCRIPTION OF THE DRAWINGS

FIG. 3a shows $x_2x_3$-cross-sections of the phantom at time corresponding to view 101.

FIG. 3b shows $x_2x_3$-cross-sections of the phantom at time corresponding to view 900.

FIG. 3c shows $x_2x_3$-cross-sections of the phantom at time corresponding to view 501.

FIG. 4a shows a density plot of Bf at the beginning of iterations when zero motion is assumed for $x_1x_2$-cross-section through the center of the grid.

FIG. 4b shows images of the bright spots corresponding to density plots shown in FIG. 4a.

FIG. 4c shows a density plot of Bf at the beginning of iterations when zero motion is assumed for $x_1x_3$-cross-section through the center of the grid.

FIG. 4d shows images of the bright spots corresponding to density plots shown in FIG. 4c.

FIG. 4e shows a density plot of Bf at the beginning of iterations when zero motion is assumed for $x_2x_3$-cross-section through the center of the grid.

FIG. 4f shows images of the bright spots corresponding to density plots shown in FIG. 4e.

FIG. 5a shows the a density plot of Bf at the end of iterations for cross-section $x_1x_2$ through the center of the grid.

FIG. 5b shows images of bright spots corresponding to the density plot shown in FIG. 5a.

FIG. 5c shows the a density plot of Bf at the end of iterations for cross-section $x_1x_3$ through the center of the grid.

FIG. 5d shows images of bright spots corresponding to the density plot shown in FIG. 5c.

FIG. 5e shows the a density plot of Bf at the end of iterations for cross-section $x_2x_3$ through the center of the grid.

FIG. 5f shows images of bright spots corresponding to the density plot shown in FIG. 5e.

FIG. 6b shows density plots of Bf at the end of iterations corresponding to FIG. 6a.

FIG. 7a shows a density plot of Bf at the beginning of iterations based on $\partial^2/\partial q^2$ for cross-section $x_1x_2$ through the center of the grid.

FIG. 7b shows the results of bright pixel detection using the LT function shown in FIG. 7a.

FIG. 7c shows the results of bright pixel detection using the LT function based on the filter according to the present invention.

FIG. 7d shows a density plot of Bf at the beginning of iterations based on $\partial^2/\partial q^2$ for cross-section $x_1x_3$ through the center of the grid.

FIG. 7e shows the results of bright pixel detection using the LT function shown in FIG. 7d.

FIG. 7f shows the results of bright pixel detection using the LT function based on the filter according to the present invention.

FIG. 7g shows a density plot of Bf at the beginning of iterations based on $\partial^2/\partial q^2$ for cross-section $x_1x_2$ through the center of the grid.

FIG. 7h shows the results of bright pixel detection using the LT function shown in FIG. 7g.

FIG. 7i shows the results of bright pixel detection using the LT function based on the filter according to the present invention.

FIG. 8b shows the results of bright pixel detection using the LT function shown in FIG. 8a.

DESCRIPTION OF THE PREFERRED EMBODIMENTS

Figure 1A:
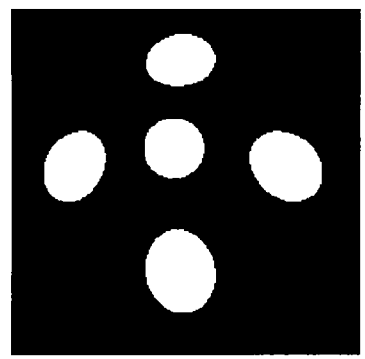
FIG. 1a shows $x_1 x_2$-cross-sections of the phantom at time corresponding to view 101.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The methods of the present invention provide an algorithm for tomography in the motion contaminated case. The motion contaminated case occurs when the object being scanned is undergoing some transformation during the scan. Thus, the phrases "the object is undergoing a transformation" and "there is some motion in the object" have the same meaning in this invention.

It is shown that micro locally, away from some critical directions, LT is equivalent to a pseudo differential operator of order one. LT also produces nonlocal artifacts that have the same strength as useful singularities. When motion is not accurately known, singularities inside the object f being scanned spread in different directions. For example, a single edge can become a double edge. In the case of a double edge, the image of f looks cluttered. Based on this observation the present invention provides an algorithm for motion estimation using an empiric measure of image clutter, referred to throughout the description as edge entropy. By minimizing edge entropy, the motion model is found. The algorithm is flexible and can also used for solving the misalignment correction problem.

The following detailed description discloses cone-beam LT function Bf and establishes its main properties and then explains the location and strength of the nonlocal artifacts. As opposed to LT in the static case, it is not possible to find the direction of differentiation, which reduces the strength of the artifact by one order in the scale of Sobolev spaces. A similar result for a different geometry was recently reported in E. T. Quinto, Electron microscope tomography, Conference talk at workshop on Mathematical Methods in Emerging Modalities of Medical Imaging, Banff International Research Station, Banff, Canada, 2009. Then, explicit formulas for the shift between the singularities in Bf and f in the case when motion is known incorrectly is obtained. A similar result is described in A. Katsevich, Improved cone beam local tomography, Inverse Problems, 22 (2006), pp. 627-643 which gives only an implicit relation, and the model used for describing changes in f is different from the model used in the present invention. The novel motion estimation algorithm as well as a description of the motion model and definition of edge entropy is described and results of numerical experiments on motion estimation and misalignment correction are given.

Let C be a smooth curve in $\mathbb{R}^3$ $$I \ni s \to z(s) \in \mathbb{R}^3, |z'_s(s)| \neq 0, \quad \text{Eq. (1)}$$

where $I \subset \mathbb{R}$ is an interval. Usually the source moves along C with constant speed, so we identify s with time variable.

Fix any $s_0 \in I$. We refer to $s=s_0$ as the reference time. To describe the motion inside the object being scanned, we introduce the function $\psi$. Suppose $y=\psi(s,x)$ is the position of the particle at time s, which is located at x at the reference time $s=s_0$. We assume that for each $s \in I$ the function $\psi(s,x): \mathbb{R}^3 \to \mathbb{R}^3$ is a diffeomorphism. Physically this means that two distinct points cannot move into the same position. This assumption is quite natural, since cardiac motion is not infinitely compressible. The inverse of $\psi$ is the function $x=v(s, y): \mathbb{R}^3 \to \mathbb{R}^3$. It gives the original position x of the particle at the reference time, which is located at y at time s. We assume that both psi and v are identity maps outside of some open set U, which contains the support of the object, and $\psi, v \in C^\infty(I \times \mathbb{R}^3)$. As usual, we assume that C is at a positive distance from U. Obviously, $$v(s,\psi(s,x)) \equiv x, \psi(s,v(s,x)) \equiv x. \quad \text{Eq. (2)}$$

Differentiating the first equation in equation (2) with respect to s and x gives useful identities $$v'_s(s,\psi(s,x)) + \nabla v(s,\psi(s,x))\psi'_s(s,x) \equiv 0, \nabla v(s,\psi(s,x))\nabla \psi(s,x) \equiv Id, \quad \text{Eq. (3)}$$

where Id is the 3×3 identity matrix. In equation (3) and everywhere below we use the convention that the operator $\nabla$ acts with respect to space variables. Thus $$\nabla v(s,y) = \nabla_y v(s,y) \text{ and } \nabla \psi(s,x) = \nabla_x \psi(s,x).$$

Since matter is conserved, the x-ray density at time s and point y is given by $|\nabla v(s,y)|f(v(s,y))$. Hence the data are $$D_f(s, \beta) := \int_0^\infty |\nabla v(s, z(s) + t\beta)| f(v(s, z(s) + t\beta)) dt, s \in I, \quad \text{Eq. (4)}$$

where $\beta$ runs through a subset of the unit sphere determined by the detector. The human tissue is not compressible, so in most cases we can assume $|\nabla v(s,y)| \approx 1$ when performing numerical experiments.

The present invention introduces the following LT function:

$$(\mathcal{B}f)(x) = \int_I \varphi(s, x) \frac{\partial^2}{\partial q^2} D_f(s, \beta(s, x + q\Theta(s, x)))|_{q=0} ds, \quad \text{Eq. (5)}$$

where $$\beta(s, x) = \frac{\psi(s, x) - z(s)}{|\psi(s, x) - z(s)|}, \quad \text{Eq. (6)}$$

$\Theta(s,x): I \times U \to \mathbb{R}^3 \setminus 0$ is a smooth function, and $\phi \in C_0^\infty(I \times U)$. Note that Equation (5) reduces to Equation (2.2) of A. Katsevich, Improved cone beam local tomography, Inverse Problems, 22 (2006), pp. 627-643, if $\beta(s,x+q\Theta(s,x))$ is replaced with $\beta(q, x)$. Equation (2.2) of A. Katsevich, Improved cone beam local tomography, Inverse Problems, 22 (2006), pp. 627-643, was developed with the goal of reducing the global artifact inherent in cone-beam data inversion as much as possible. The additional flexibility provided by $\Theta$ is needed for increasing computational efficiency. A slight change in the direction of differentiation away from the optimal one may lead to a significant speed-up at the expense of only a slight increase in the global artifact. The function $\psi$ in Equation (5) determines the time interval, which is used for motion estimation. Define $$\Phi(x,s,t) := v(s, z(s) + t(\psi(s,x) - z(s))), t > 0, s \in I, x \in U. \quad \text{Eq. (7)}$$

For a fixed $x \in U$ and $s \in I$, $\Phi(x,s,t)$, $t > 0$, is the pre-image of the ray with vertex at $z(s)$ and passing through $\psi(s,x)$. For a fixed $x \in U$, $\Phi(x, s, t)$ defines a surface parametrized by and t. For convenience, this surface is denoted $\Phi_x$. Using Equation (3), we get $$\Phi'_s(x, s, t) := v'_s(s, \tilde{y}) + \nabla v(s, \tilde{y})(z'_s(s) + t(\psi'_s(s, x) - z'_s(s))) = \nabla v(s, \tilde{y})\{[z'_s(s) + t(\psi'_s(s, x) - z'_s(s))] - \psi'_s(s, \tilde{x})\}, \quad \text{Eq. (8)}$$

$$\Phi'_t(x, s, t) := \nabla v(s, \tilde{y})(\psi(s, x) - z(s)), \quad \text{Eq. (9)}$$

where $$\tilde{y}(x, s, t) = z(s) + t(\psi(s, x) - z(s)), \tilde{x} = v(s, \tilde{y}). \quad \text{Eq. (10)}$$

If $t \neq 1$, then $\tilde{y}(x, s, t) \neq \psi(s,x)$. The expression in brackets in Equation (8) is the velocity of the point $\tilde{y}$, if we regard it as a fixed point which divides the line segment with endpoints $z(s)$ and $\psi(s,x)$ in the ratio $t:1-t$. $\psi'_s(s, \tilde{x})$ is the velocity of $\tilde{y}$, if it moves according to the motion function $\psi$. From Equations (8), (9), the surface $\Phi_x$ is smooth at the point $\Phi(x, s, t)$ if the difference of the two velocities is not parallel to the line segment. We say that $\Phi_x$ is smooth if it is smooth at any point $z \in \Phi_x, z \neq x$.

Proposition 1.

Suppose $\Phi_x$ is smooth for all $x \in U$. The operator B defined by Equation (5) extends to a map $\epsilon'(U) \to \epsilon'(U)$, and $$WF(Bf) \subset WF_v(f) \cup E(f,C,\psi), E(f,C,\psi) := \{(x,\eta) \in T^*U \setminus 0: (y,\xi) \in N^*\Phi_x \cap WF(f), \eta = \xi \cdot \nabla \Phi(x,s_0,t_0), y = \Phi(x,s_0,t_0) \neq x, (s_0,x) \in \text{supp}\phi\}. \quad \text{Eq. (11)}$$

Here $N^*\Phi_x$ is the co-normal bundle of $\Phi_x$. In short, g has an additional singularity at x if $\Phi_x$, is tangent to singsupp f at some point $y \neq x$. The singularities of Bf, which coincide with those of f, are "useful" (from the point of view of practical applications of tomography), while the set $E(f, C, \psi)$ represents the artifact.

Proof. Denote $$m := \inf_{s \in I, x \in U} |x - z(s)|, \quad M := \sup_{s \in I, x \in U} |x - z(s)|, \quad \text{Eq. (12)}$$

and pick $\delta$, $0 < \delta < m$. Let $w(t)$ be a function with the properties $$w(t) \in C_0^\infty([m-\delta, M+\delta]), w(t)=1, t \in [m,M]. \quad \text{Eq. (13)}$$

This function is inserted in the integral in Equation (4) to ensure that the integration with respect to t is performed over a compact interval, which does not contain $t=0$.
Pick any $g \in C^\infty(U)$ and consider the integral $$\langle Bf, g \rangle := \int_U (Bf)(x) g(x) dx, \quad \text{Eq. (14)}$$

where $f \in C_t^\infty(U)$. Substituting Equation (4) into Equation (5) and changing variables $$t_1 = t/|\psi(s, x+q\Theta(s,x)) - z(s)| \quad \text{Eq. (15)}$$

we get that the argument of f in Equation (14) becomes $$z = v(s, z(s) + t_1(\psi(s, x+q\Theta(s,x)) - z(s))) \quad \text{Eq. (16)}$$

Applying Equation (2) gives $$v\left(s, \frac{\psi(s,z) - z(s)}{t_1} + z(s)\right) = x + q\Theta(s, x) \quad \text{Eq. (17)}$$

Since $\Theta(s,x)$ is a smooth function, q is restricted to a small neighborhood of zero, and $t_1$ is bounded away from zero, it is clear that Equation (17) defines a smooth diffeomorphism $z \to x = X(z,s,t,q)$. i) Taking the derivative with respect to q outside the integral in Equation (14), ii) interchanging the order of integration so that the integral with respect to x becomes the innermost one, and iii) changing variables $x \to z$ according to Equation (17), we get $$\langle Bf, g \rangle = \langle f, B^* g \rangle, \quad \text{Eq. (18)}$$

where $B^* g \in C^\infty(U)$. The first assumption of the proposition now follows from continuity. The proof of Equation (11) is given below.

Next we compute the principal symbol of B. Besides the smoothness of $\Phi_x$, the additional assumptions we make in this calculation are that (1) $\Phi''_{st}(x,s,t=1)$ is never a zero vector, and (2) $\Phi''_{st}(x,s,t=1)$ and $\Phi'_t(x,s,t=1)$ are not parallel. Let us discuss these assumptions. Setting $t=1$ in Equation (9) and Equation (10) gives $\check{y} = \psi(s,x)$ and $$\Phi''_{st}(x, s, t=1) = \frac{d}{ds}[\nabla v(s, \psi(s, x))](\psi(s, x) - z(s)) + \quad \text{Eq. (19)}$$
$$\nabla v(s, \psi(s, x))(\psi'_s(s, x) - z'_s(s)).$$

From the second equation in Equation (3), $$\frac{d}{ds}[\nabla v(s, \psi(s, x))]\nabla \psi(s, x) + \nabla v(s, \psi(s, x))\nabla \psi'_s(s, x) = 0, \quad \text{Eq. (20)}$$

so $$\Phi''_{st}(x, s, t=1) = \nabla v(s, \psi(s, x))[(\psi'_s(s, x) - z'_s(s)) - \quad \text{Eq. (21)}$$
$$\nabla \psi'_s(s, x) \nabla v(s, \psi(s, x))(\psi(s, x) - z(s))].$$

Since v is a diffeomorphism, $\Phi''_{st}(x,s,t=1) = 0$ is equivalent to $$z'_s(s) = \psi'_s(s,x) - \nabla \psi'_s(s,x) \nabla v(s, \psi(s,x))(\psi(s,x) - z(s)). \quad \text{Eq. (22)}$$

If the source rotates sufficiently fast compared to the motion of the medium, Equation (22) is never satisfied. Comparing Equation (21) with Equation (8) we get that $\Phi''_{st}(x,s,t=1)$ and $\Phi'_t(x,s,t=1)$ are not parallel if $$\psi(s,x) - z(s) \nparallel (\psi'_s(s,x) - z'_s(s)) - \nabla \psi'_s(s,x) \nabla v(s, \psi(s,x))(\psi(s,x) - z(s)). \quad \text{Eq. (23)}$$

Assuming again that the source rotates sufficiently fast, Equation (23) is equivalent to the requirement that the tangent to the source trajectory never points into the region of interest. This is a common condition, which is satisfied by all practical scanning trajectories.
From Equations (4) and (5) we get $$(\mathcal{B}f)(x) = \int_{\mathbb{R}^2} \varphi(s, x) w(t) \times \frac{\partial^2}{\partial q^2} |\nabla v(s, z(s) + t\beta(s, x + \quad \text{Eq. (24)}$$
$$q\Theta))| f(v(s, z(s) + t\beta(s, x + q\Theta))|_{q=0} dt ds.$$

Representing f in terms of its Fourier transform and changing variables gives $$(\mathcal{B}f)(x) = \frac{1}{(2\pi)^3} \int_{\mathbb{R}^d} \tilde{f}(\xi) B(x, \xi) e^{-i\xi \cdot x} d\xi, \quad \text{Eq. (25)}$$
$$B(x, \xi) := \int_{\mathbb{R}^2} Q_0(x, \xi, s, t) e^{-i\xi \cdot (\Phi(x,s,t)-x)} dt ds,$$

where $Q_0(x,\xi,s,t) \in S^2(U \times \mathbb{R}^3)$, the seminorms of $Q_0$ as member of the symbol class $S^2$ are uniformly bounded with respect to $(s,t) \in \mathbb{R}^2$, and the asymptotics of $Q_0$ is given by $$Q_0(x,\xi,s,t) = -\phi(s,x) w(t|\psi(s,x) - z(s)|) |\psi(s,x) - z(s)| \times$$
$$[(t\xi \cdot \nabla v(s, \check{y}(x,s,t)) \nabla \psi(s,x) \Theta(s,x))^2 + O(|\xi|)], \quad (26)$$
$$|\xi| \to \infty.$$

The term $O(|\xi|)$ in Equation (26) is stable when differentiated with respect to s and t any number of times. Using Equations (8), (9), we get that at the stationary point of the phase $$\xi \cdot \nabla v(s,\check{y})([z'(s) + t(\psi'_s(s,x) - z'(s))] - \psi'_s(s,\check{x})) = 0,$$
$$\xi \cdot \nabla v(s,\check{y})(\psi(s,x) - z(s)) = 0. \quad \text{Eq. (27)}$$

If $t=1$, then $x=\check{x}$ and the first equation in Equation (27) is trivially satisfied. Hence $(s, t=1)$ is a stationary point if is perpendicular to $\nabla v(s,\check{y})(\psi(s,x) - z(s))$, where $\check{y} = \psi(s,x)$. By construction, $\xi \cdot \Phi''_{ss}(x,s,t=1) \equiv 0$. Thus the stationary point is non-degenerate if $\xi \cdot \Phi''_{st}(x,s,t=1) \neq 0$. In view of the second equation in Equation (27), the critical direction at any (s,x) is given by $$\xi_{cr}(s,x) := \Phi'_t(x,s,t)|_{t=1} \times \Phi''_{st}(x,s,t)|_{t=1}. \quad \text{Eq. (28)}$$

Let $s_j = s_j(x,\xi)$, $j=1, 2, \ldots$, be the solutions to Equation (27) with $t=1$. Assume $\xi$ is away from a conic neighborhood of the set $$\text{Crit}(x) := \{\xi \in \mathbb{R}^3 \setminus 0 : \xi = \xi_{cr}(s,x), (s,x) \in \text{supp } \phi\}. \quad \text{Eq. (29)}$$

Then the critical points $(s_j, t=1)$ are non-degenerate, and by the stationary phase method $$B(x, \sigma\xi) = \qquad\qquad\text{Eq. (30)}$$
$$-2\pi\sigma\sum_{j}\varphi(s_j,x)|\psi(s_j,x)-y(s_j)|\frac{|\xi\cdot\Theta(s_j,x)|^2}{|\xi\cdot\Phi''_{st}(x,s_j,t=1)|}+$$
$$O(1), \sigma\to\infty.$$

Here we have used the second equation in Equation (3), that $\Phi(x,s,t=1)\equiv x$, and the signature of the Hessian of the phase at the stationary point equals zero. If we choose, for example, $$\Theta(s,x)=\Phi''_{st}(x,s,t=1), \qquad\text{Eq. (31)}$$

then Equation (30) becomes $$B(x, \sigma\xi) = \qquad\qquad\text{Eq. (32)}$$
$$-2\pi\sigma\sum_{j}\varphi(s_j,x)|\psi(s_j,x)-y(s_j)|\times|\xi\cdot\Phi''_{st}(x,s_j,t=1)|+$$
$$O(1), \sigma\to\infty.$$

Artifact.

We are now interested in solutions to Equation (27) with $t\neq 1$. Similarly to Equation (25), we have:

$$(\mathcal{B}f)(x) = \frac{1}{(2\pi)^3}\int \tilde{f}(\xi)\left\{\int Q_0(x,\xi,s,t)e^{-i\xi\cdot\Phi(x,s,t)}dsdt\right\}d\xi. \qquad\text{Eq. (33)}$$

Consider the integral with respect to s and t. Pick some $x_0\in U$, $s_0\in I$, and $t_0\neq 1$, and set $$\xi=\Phi'_s(x_0,s_0,t_0)\times\Phi'_t(x_0,s_0,t_0). \qquad\text{Eq. (34)}$$

Suppose $s=s(x,\xi)$ and $t=t(x,\xi)$ solve the system $$\xi\cdot\Phi'_s(x,s,t)=0, \xi\cdot\Phi'_t(x,s,t)=0 \qquad\text{Eq. (35)}$$

for $(x,\xi)$ in a conic neighborhood of $(x_0,\xi_0)$. In general there can be several solutions, but we are looking for the one close to $(s_0,t_0)$. Obviously, $s(x,\xi)$ and $t(x,\xi)$ are homogeneous of degree zero in $\xi$.

Systems in Equation (35) and Equation (27) are the same. However, since $t\neq 1$, no additional insight is gained by representing $\Phi$ in terms of $\psi$ and $\xi$.

Let $\kappa(x,\xi)$ be the Gaussian curvature of $\Phi_x$ at the point $y=\Phi(x,s(x,\xi),t(x,\xi))$. When there is no motion, $\Phi_x$ is a ruled surface with zero Gaussian curvature. In the presence of motion we can assume that, generically, $\kappa(x,\xi)\neq 0$. The Hessian of the phase at the stationary point is proportional to the curvature:

$$\det\begin{pmatrix}\xi\cdot\Phi''_{ss}(x,s,t) & \xi\cdot\Phi''_{st}(x,s,t)\\ \xi\cdot\Phi''_{st}(x,s,t) & \xi\cdot\Phi''_{tt}(x,s,t)\end{pmatrix}= \qquad\text{Eq. (36)}$$
$$\kappa(x,\xi)|\xi|^2|\Phi'_s(x,s,t)\times\Phi'_t(x,s,t)|^2,$$

where x, $\xi$, s, and t satisfy Equation (35). By assumption $\Phi'_s$ and $\Phi'_t$ are linearly independent, i.e. $\Phi_{x_0}$ is smooth at $y_0=\Phi(x_0,s(x_0,\xi_0),t(x_0,\xi_0))$. Hence the right-hand side of Equation (36) is not zero at $x_0$, $\xi_0$, $s_0$, $t_0$, the Hessian is non-degenerate, and the functions $s(x,\xi),t(x,\xi)$ are locally well-defined and smooth. By the stationary phase method, $$\int Q_0(x,\xi,s,t)e^{-i\xi\cdot\Phi(x,s,t)}dsdt=Q_1(x,\xi)e^{-i\xi\cdot\Phi(x,s(x,\xi),t(x,\xi))}, \qquad\text{Eq. (37)}$$

where $Q_1$ is a symbol from the class $S^1$ in a conic neighborhood of $(x_0,\xi_0)$ (cf. (26)), and the asymptotics of $Q_1$ is given by $$Q_1(x,\xi) = c\frac{Q_0(x,\xi,s(x,\xi),t(x,\xi))}{|\det(\xi\cdot\Phi'')|^{1/2}}+O(1), |\xi|\to\infty, \qquad\text{Eq. (38)}$$

where $\xi\cdot\Phi''$ is the matrix in Equation (36), and constant c incorporates some powers of $2\pi$ and i. Combine Equation (33) and Equation (38):

$$(\mathcal{B}f)(x) = \frac{1}{(2\pi)^3}\int \tilde{f}(\xi)Q_1(x,\xi)e^{-ia(x,\xi)}d\xi, \qquad\text{Eq. (39)}$$

where $a(x,\xi):=\xi\cdot\Phi(x,s(x,\xi),t(x,\xi))$. If $\det(\partial^2 a(x,\xi)/\partial x\partial\xi)\neq 0$ at $(x_0,\xi_0)$, then locally Equation (39) is a Fourier Integral Operator (FIO) associated with a canonical transformation, and the order of the operator equals one (see L. Hormander, The Analysis of Linear Partial Differential Operators. IV. Fourier Integral Operators, Springer-Verlag, Berlin, 1985, pp. 25, 26). In view of Equation (30) this means that the artifacts and useful singularities can be of the same strength in the scale of Sobolev spaces.

Incorrectly Known Motion.

Suppose that instead of the motion function $\psi$ we know its approximation $\psi_\epsilon(s,x)=\psi(s,x)+\epsilon\psi_1(s,x)$. In this case the function $\Phi$ of Equation (7) is replaced by $$\Phi(\epsilon,x,s,t):=\nu(s,z(s)+t(\psi_\epsilon(s,x)-z(s))). \qquad\text{Eq. (40)}$$

Consequently, the useful singularities of Bf no longer coincide with the singularities of f. To find the shift between them we assume that the error in $\psi_\epsilon$ is small, i.e., $\epsilon\to 0$, and find the first order approximation of the shift. If $\epsilon=0$, the function $s(x,\xi)$ is determined from Equation (35) with $t(x,\xi)\equiv 1$. If $\epsilon\neq 0$, we have to solve $$\xi\cdot\Phi'_s(\epsilon,x_\epsilon,s_\epsilon,t_\epsilon)=0, \xi\cdot\Phi'_t(\epsilon,x_\epsilon,s_\epsilon,t_\epsilon)=0,$$

$$\Phi(\epsilon,x_\epsilon,s_\epsilon,t_\epsilon)=\Phi(0,x,s,t=1). \qquad\text{Eq. (41)}$$

Equations (41) mean that the singularity of f at x is mapped into the singularity of Bf at $x_\epsilon$. Set $x_\epsilon=x+\Delta x$, $s_\epsilon=s+\Delta s$, $t_\epsilon=1+\Delta t$. Expanding Equation (41) in the Taylor series around $\epsilon=0$, using Equation (35), and keeping the first order terms in $\epsilon$, gives $$\epsilon\xi\cdot\Phi''_{\epsilon s}+\xi\cdot\nabla\Phi'_s\Delta x+\xi\cdot\Phi''_{ss}\Delta s+\xi\cdot\Phi''_{st}\Delta t=0,$$

$$\epsilon\xi\cdot\Phi''_{\epsilon t}+\xi\cdot\nabla\Phi'_t\Delta x+\xi\cdot\Phi''_{st}\Delta s+\xi\cdot\Phi''_{tt}\Delta t=0,$$

$$\epsilon\Phi'_\epsilon+\nabla\Phi\Delta x+\Phi'_s\Delta s+\Phi'_t\Delta t=0. \qquad\text{Eq. (42)}$$

All the derivatives in Equation (42) are computed at $\epsilon=0$, x, $s=s(x,\xi)$, and $t=1$. Since $\Phi(0,x,s,t=1)\equiv x$, then $\nabla\Phi'_s=0$, $\Phi''_{ss}=0$, $\Phi'_s=0$. The first and third equations in Equation (42) yield:

$$\Delta t = -\epsilon\frac{\xi\cdot\Phi''_{\epsilon s}}{\xi\cdot\Phi''_{st}}, \Delta x = \epsilon(\nabla\Phi)^{-1}\left[\Phi'_t\frac{\xi\cdot\Phi''_{\epsilon s}}{\xi\cdot\Phi''_{st}}-\Phi'_\epsilon\right]. \qquad\text{Eq. (43)}$$

When $t=1$, $\nabla\Phi=\text{Id}$, and $$\Phi'_t=\nabla\nu(\psi(s,x)-z(s)), \Phi'_\epsilon=\nabla\nu\psi_1(s,x). \qquad\text{Eq. (44)}$$

Substituting into Equation (43) gives $$\Delta x = \epsilon \nabla v(s, \psi(s,x))[c(\psi(s,x) - z(s)) - \psi_1(s,x)] + O(\epsilon^2), \quad \text{Eq. (45)}$$

$$c = \frac{\xi \cdot \Phi''_{cs}}{\xi \cdot \Phi''_{st}}.$$

By our assumption $\xi \cdot \Phi''_{st} \neq 0$, so $\Delta x$ is indeed of order $O(\epsilon)$, $\epsilon \to 0$.

End of Proof of Proposition 1.

Using a partition of unity we may suppose that WF(f) is a subset of a sufficiently small conic neighborhood of $(x_0, \xi_0) \in T^*U$, and $Q_0 \equiv 0$ (cf. Equations (26) and (33)) for (s,t) outside a sufficiently small neighborhood of $(s_0, t_0) \in I \times \mathbb{R}_+$. Initially we consider the case $t_0 \neq 1$. First of all, from Equations (4) and (5), (Bf)(x)≡0 outside a neighborhood of $y_0 = \Phi(x_0, s_0, t_0)$. In view of the partition of unity, Equation (4) needs to be modified by including a cut-off function depending on t. Passing to a finer partition of unity if necessary, Equation (33) implies that (Bf)(x) is smooth near $y_0$ unless $\xi_0$ is parallel to $\Phi'_s(x_0, s_0, t_0) \times \Phi'_t(x_0, s_0, t_0)$. If the two vectors are parallel, we multiply Equation (33) by $\phi_1(x)e^{ix \cdot \eta}$, where $\phi_1 \in C_0^\infty$ and is supported in a neighborhood of $y_0$, and $\eta_0 \neq \xi_0 \cdot \nabla \Phi(x_0, s_0, t_0)$. Integrating with respect to x and using the standard argument (see e.g. Y. V. Egorov and B.-W. Schulze, Pseudo-differential Operators, Singularities, Applications, Birkhauser, Basel, 1997, p. 114), we get that $(y_0, \eta_0) \notin$ WF(Bf). Suppose now $t_0 = 1$. Since $\Phi(x, s, t=1) \equiv x$ and $\xi_0 \equiv \xi_0 \cdot \nabla \Phi(x_0, s_0, t_0 = 1)$, we get as before that $(x_0, \xi_0) \notin$ WF(f) implies $(x_0, \xi_0) \notin$ WF(Bf), and Equation (11) is proven.

A Motion Estimation Algorithm.

The motion estimation algorithm of the present invention is based on LT. In the case of static objects, the discontinuities (or, edges) of f and Bf generally coincide (see e.g., D. Finch, I.-R. Lan, and G. Uhlmann, Microlocal analysis of the x-ray transform with sources on a curve, in Inside Out: Inverse Problems and Applications, G. Uhlmann, ed., Cambridge University Press, Cambridge, UK, 2003, pp. 193-218; A. Katsevich, Improved cone beam local tomography, Inverse Problems, 22 (2006), pp. 627-643; A. K. Louis and P. Maass, Contour reconstruction in 3-D X-ray CT, IEEE Trans. Med. Imaging, 12 (1993), pp. 764-769) except for the added singularities or artifacts in Bf and the singularities of f that are invisible from the data. As mentioned above, if there is some uncompensated motion in f, the edges of f and Bf no longer coincide. Practically this means that if motion is not known (or, is known incorrectly), edges in the reconstructed image spread out. A single edge produces multiple edges at several locations. Consequently, the reconstructed image looks clattered or random. We can use a measure of randomness in the reconstructed image Bf to gauge whether our motion model is accurate or not. In what follows we call this measure "edge entropy". Using this idea, we summarize the proposed motion estimation algorithm as follows.

1. Assume some motion model;
2. Perform motion-compensated LT image reconstruction using current motion model;
3. Compute edge entropy of the LT image;
4. If edge entropy is low (i.e., the edges have not spread too much), stop. If edge entropy is high, change the motion model and go to step (2).

A similar idea was used in Y. Kyriakou, R. M. Lapp, L. Hillebrand, D. Ertel, and W. Kalender, Simultaneous misalignment correction for approximate circular cone-beam computed tomography, Phys. Med. Biol., 53 (2008), pp. 6267-6289, for misalignment correction in circular cone beam CT. The main novelty of our approach is that we use LT instead of global Feldkamp type (FDK) reconstruction. On one hand, the use of LT allows us to significantly speed up the iterations. On the other hand, many tools that work with conventional images (most notably, image entropy) do not work with LT images, so we had to develop alternative tools from scratch. The following paragraphs describe the key steps of the algorithm in more detail.

Motion Model.

Let $[s_l, s_r] \subset I$ be a parameter/time window, which is used for motion estimation. The center point $s_0 = (s_l + s_r)/2$ is taken as reference time. The primary purpose of the algorithm of the present invention is to perform local (in time) motion estimation, thus the width of the window $S := s_r - s_l$ is usually rather short. In our experiments S is typically less than one gantry rotation. Let $D \subset U$ denote the region where motion takes place. We assume that D is a rectangle, i.e. $D := \{(x_1, x_2, x_3) \in \mathbb{R}^3 : L_k \leq x_k \leq R_k, k=1, 2, 3\}$. To represent motion, we consider a regular grid over D. The grid planes are $$x_k = \zeta_{ik} := L_k + i \Delta x_k, 0 \leq i \leq N_k+1, k=1,2,3, \quad \text{Eq. (46)}$$

where $\Delta x_k = (R_k - L_k)/(N_k + 1)$ is the step-size along the k-th axis. Thus, grid in Equation (46) has $N_1 N_2 N_3$ interior nodes, and for each direction k there are $N_k + 2$ planes $x_k = \zeta_{0k}, \ldots, x_k = \zeta_{N_k+1,k}$. Because of motion, the grid planes deform over time:

$$x_1 = \zeta_{i1} + a_{i1}(s)\phi[(x_2 - L_2)/(R_2 - L_2)]\phi[(x_3 - L_3)/(R_3 - L_3)], \quad 1 \leq i \leq N_1,$$

$$x_2 = \zeta_{i2} + a_{i2}(s)\phi[(x_1 - L_1)/(R_1 - L_1)]\phi[(x_3 - L_3)/(R_3 - L_3)], \quad 1 \leq i \leq N_2,$$

$$x_3 = \zeta_{i3} + a_{i3}(s)\phi[(x_1 - L_1)/(R_1 - L_1)]\phi[(x_2 - L_2)/(R_2 - L_2)], \quad 1 \leq i \leq N_3. \quad \text{Eq. (47)}$$

Each line in Equation (47) defines a separate surface, which corresponds to a deformation of one of the original planes Equation (46). We assume that motion equals zero at the boundary of D, so the boundary grid planes (i.e. those given by $x_k = \zeta_{ik}$, i=0 or $N_k+1$, k=1, 2, 3) do not deform. In Equation (47), the function $\phi$ is smooth, defined on the interval [0,1], and equals zero at both endpoints of the interval. Since the time window $[s_l, s_r]$ is sufficiently short, we assume that the functions $a_{ik}(s)$ are linear:

$$a_{ik}(s) = a_{ik}(s - s_0)/(0.5S), k=1,2,3, \quad \text{Eq. (48)}$$

where $a_{ik}$, $1 \leq i \leq N_k$, k=1, 2, 3, are constants to be determined. Note that substituting $s = s_0$ into Equation (47) gives the rectangular grid of Equation (46). Equations (47) and (48) allow us to describe motion of every point in D. To determine where a node from the original grid of Equation (46) is located at time s, we identify the three planes where the node is located, deform them according to Equation (47), and then find the point of intersection of the three resulting surfaces. Location of all other pixels is computed using trilinear interpolation.

Edge Entropy.

Suppose Bf is computed on a regular grid $(x_{i_1}, x_{i_2}, x_{i_3})$, $1 \leq i_k \leq M_k$, k=1, 2, 3, which covers D. Suppose, for simplicity, that the step-size of the grid is the same along every axis and equals $\Delta x$. Nodes of the grid are denoted $x_I := (x_{i_1}, x_{i_2}, x_{i_3})$, where $I = (i_1, i_2, i_3)$. Of course, this grid should be much more dense than the one in Equation (46) ($M_k \gg N_k$). We also need a shifted grid with nodes $\bar{x}_I := (\bar{x}_{i_1}, \bar{x}_{i_2}, \bar{x}_{i_3})$, where $\bar{x}_{i_k} = x_{i_k} + \Delta x/2$, $1 \leq i_k \leq M_k - 1$, k=1, 2, 3. Introduce the distance function:

$$\text{dist}(\bar{x}_i, \bar{x}_j) = \max(|i_1 - j_1|, |i_2 - j_2|, |i_3 - j_3|). \quad \text{Eq. (49)}$$

Calculation of edge entropy consists of several steps. Let parameter $\kappa$, $0 < \kappa < 1$, be fixed.

1. Using finite differences, compute the norm of the gradient at the nodes of the shifted grid $|\nabla(Bf)(\bar{x}_I)|$;
2. Compute the empirical histogram of the norm of the gradient;
3. Using the histogram, estimate the value M such that $|\nabla(Bf)(\bar{x}_I)| > M$ for 100κ percent of the points (such points are called "bright");
4. By running a sliding window over the image compute the total number of points $\bar{x}_I$ whose distance (in the sense of Equation (49)) to the closest bright point equals either 2, 3, or 4;
5. Divide this number by the total number of nodes in the grid and multiply by 100 (to get percents). The result is the edge entropy of the image Bf.

Numerical Experiments.

Figure 1B:
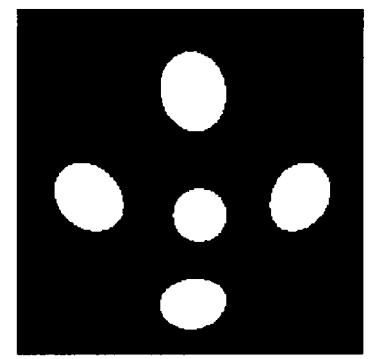
FIG. 1b shows $x_1x_2$-cross-sections of the phantom at time corresponding to view 900.
Figure 1C:
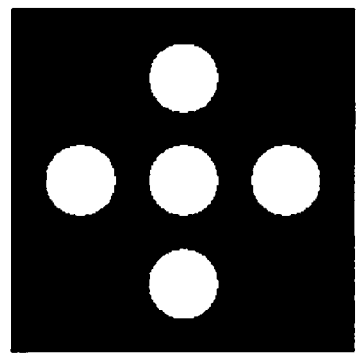
FIG. 1c shows $x_1x_2$-cross-sections of the phantom at time corresponding to view 501.
Figure 2A:
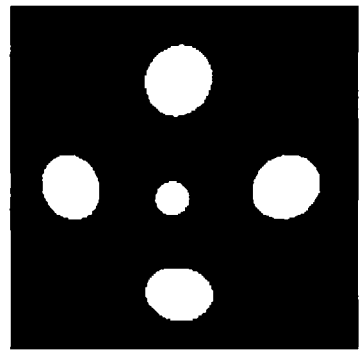
FIG. 2a shows $x_1x_3$-cross-sections of the phantom at time corresponding to view 101.
Figure 2B:
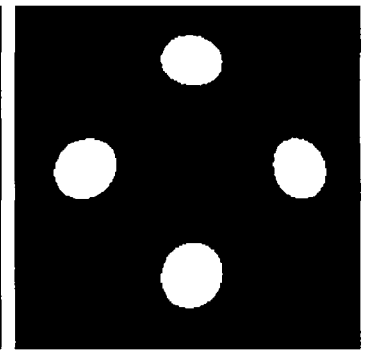
FIG. 2b shows $x_1x_3$-cross-sections of the phantom at time corresponding to view 900.
Figure 2C:
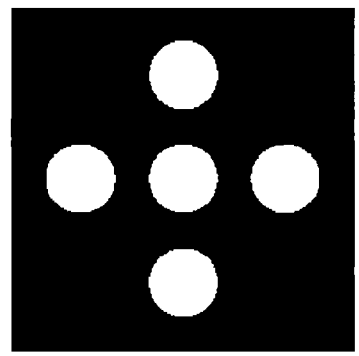
FIG. 2c shows $x_1x_3$-cross-sections of the phantom at time corresponding to view 501.
Figure 6A:
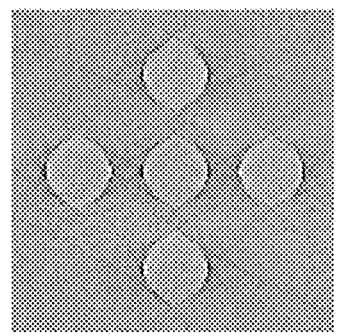
FIG. 6a shows a density plot of Bf at the beginning of iterations when a pure circular trajectory is assumed for cross-section $x_1x_2$ through the center of the grid.
Figure 6B:
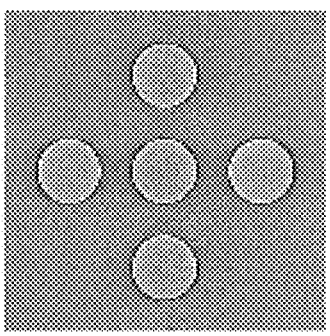
Figure 6C:
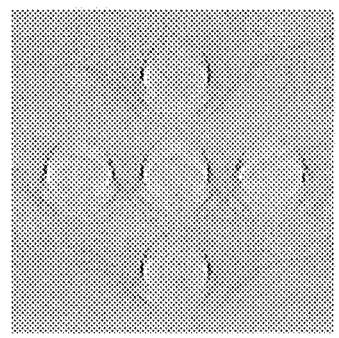
FIG. 6c shows a density plot of Bf at the beginning of iterations when a pure circular trajectory is assumed for cross-section $x_1x_3$ through the center of the grid.
Figure 6D:
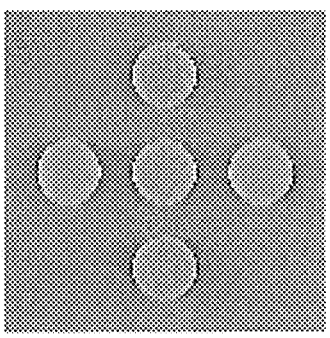
FIG. 6d shows density plots of Bf at the end of iterations corresponding to FIG. 6c.
Figure 6E:
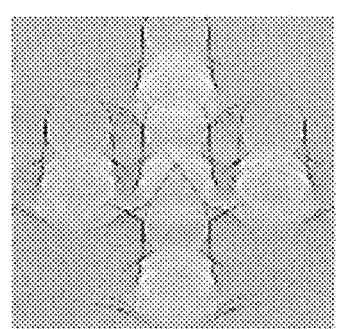
FIG. 6e shows a density plot of Bf at the beginning of iterations when a pure circular trajectory is assumed for cross-section $x_2x_3$ through the center of the grid.
Figure 6F:
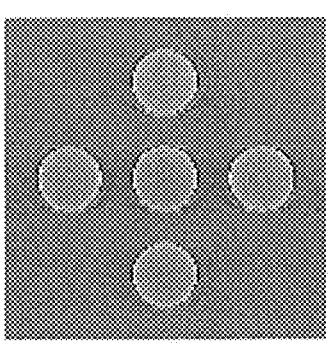
FIG. 6f shows density plots of Bf at the end of iterations corresponding to FIG. 6e.
Figure 8A:
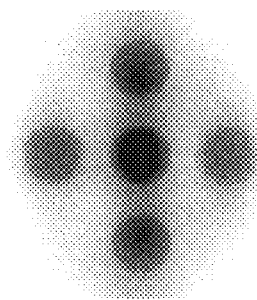
FIG. 8a shows a density plot of Bf at the end of iterations based on the filter of present invention for cross-section $x_1x_2$ through the center of the grid.
Figure 8B:
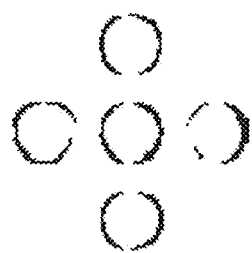
Figure 8C:
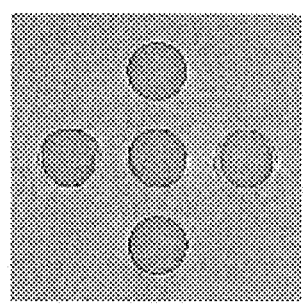
FIG. 8c shows the results of bright pixel detection using the LT function based on the filter according to the present invention.
Figure 8D:
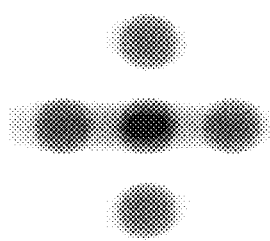
FIG. 8d shows a density plot of Bf at the end of iterations based on the filter of present invention for cross-section $x_1x_3$ through the center of the grid.
Figure 8E:
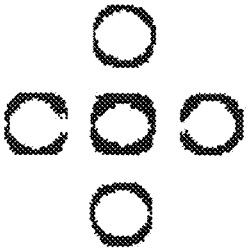
FIG. 8e shows the results of bright pixel detection using the LT function shown in FIG. 8d.
Figure 8F:
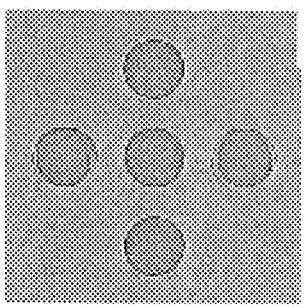
FIG. 8f shows the results of bright pixel detection using the LT function based on the filter according to the present invention.
Figure 8G:
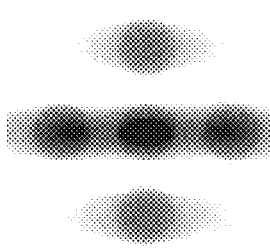
FIG. 8g shows a density plot of Bf at the end of iterations based on the filter of present invention for cross-section $x_2x_3$ through the center of the grid.
Figure 8H:
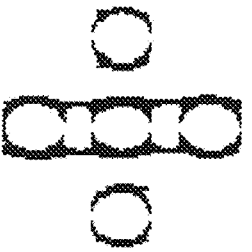
FIG. 8h shows the results of bright pixel detection using the LT function shown in FIG. 8g.
Figure 8I:
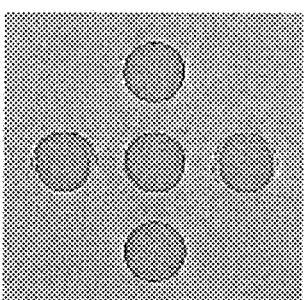
FIG. 8i shows the results of bright pixel detection using the LT function based on the filter according to the present invention.

The original phantom is a superposition of seven balls as shown in FIGS. 1-3. FIGS. 1a, 1b and 1c show $x_1x_2$-cross-sections of the phantom at a time corresponding to 101, 900 and 501, respectively. FIGS. 2a, 2b and 2c show $x_1x_3$-cross-sections of the phantom at a time corresponding to 101, 900 and 501, respectively, respectively. FIGS. 3a, 3b and 3c show $x_2x_3$-cross-sections of the phantom at a time corresponding to 101, 900 and 501, respectively, respectively.

The motion of the medium is described by the function $$\psi(s,x) = x + \begin{cases} 25\cos(0.35(s-s_0))\Theta, & |x| < 10, \\ 25\cos(0.35(s-s_0))\dfrac{75-|x|}{65}\Theta, & 10 \le |x| < 75, \\ 0, & |x| \ge 75; \end{cases} \quad \text{Eq. (50)}$$

$\Theta = (\cos\theta_2 \cos\theta_1, \cos\theta_2 \sin\theta_1, \sin\theta_2)$.
Here $s_0$ is reference time, $\theta_1 = 70°$, $\theta_2 = 30°$. In this section the units of length are always mm. The detector array is curved and passes through the isocenter. Pixel size on the detector is 0.5 along columns, and $10^{-3}$ radians along rows. The source trajectory is circular: $x_1 = R\cos s$, $x_2 = R\sin s$, $x_3 = 0$, and the source to isocenter distance is $R = 600$. There are 1000 projections per one rotation, $0 \le s < 2\pi$. The time corresponding to projection 501 was chosen as reference time: $s_0 = \pi$.

For motion estimation we used only the data corresponding to the range of projections. The data are simulated using ray tracing as described, e.g., in A. Katsevich, Motion compensated local tomography, Inverse Problems, 24 (2008), 045013. Following the common practice in medical imaging, the changes in density were not tracked due to motion (S. Rit, D. Sarrut, and L. Desbat, Comparison of analytic and algebraic methods for motion compensated cone-beam CT reconstruction of the thorax, IEEE Trans. Med. Imaging, 28 (2009), pp. 1513-1525). This is equivalent to setting $|\nabla v| = 1$ in Equation (4).

The function Bf is computed on the 112×112×112 regular grid covering the cube $-75 \le x_k \le 75$, $k=1, 2, 3$. To make the resulting algorithm as numerically efficient as possible, we use the simplest version of the motion compensated LT. To this end the derivative $\partial^2/\partial q^2$ in Equation (5) is replaced by the second derivative of the cone beam data along detector rows.

Let $D_l$ be a box-like region bounded by six neighboring planes Equation (46). As is easily seen, the values of Bf(x) for all $x \in D_l$ depend only on the six parameters describing the deformation of the six planes that form its boundary. Minimization of edge entropy uses this observation and is done using the following approach.
Step 1. Let $a_{ik}$, $i=1, \ldots N_k$, $k=1, 2, 3$, be the current best estimate of the motion parameters. Let some $\Delta a \ne 0$ be given. Pick one of the $D_l$'s. Let $a_{i_1 k_1}, \ldots, a_{i_6 k_6}$ be the six parameters affecting the chosen region. Compute $3^6$ subimages Bf(x), $x \in D_l$, corresponding to the sets $\tilde{a}_{i_1 k_1}, \ldots, \tilde{a}_{i_6 k_6}$, where each $\tilde{a}_{ik}$ equals either $a_{ik}$, or $a_{ik} - \Delta a$, or $a_{ik} + \Delta a$. Store all the subimages on the disk, and repeat for all $D_l$'s.
Step 2. Run the loop over all $3^{N_1+N_2+N_3}$ sets $a_{ik}$, $i=1, \ldots N_k$, $k=1, 2, 3$, where each $\tilde{a}_{ik}$ equals either $a_{ik}$, or $a_{ik} - \Delta a$, or $a_{ik} + \Delta a$. This is done by reading the appropriate subimages from the disk and combining them into a single image of Bf(x), $x \in D$. Then compute edge entropy for the obtained image. From the $3^{N_1+N_2+N_3}$ sets of parameters find the one which produces the image with the smallest entropy.

Steps 1 and 2 constitute a single iteration. The initial values of $a_{ik}$ are chosen to be zero (which is the no motion assumption). The value of $\Delta a$ is chosen from some a priori considerations. After the end of each iteration, the optimal set of parameters identified at Step 2 is passed on to Step 1. Also, the value of $\Delta a$ is decreased. In our experiments we used $\Delta a_{initial} = 10$, $\Delta a_{new} = 0.75 \Delta a_{old}$, and three iterations were performed.

Results of experiments are shown in FIGS. 4 and 5. FIG. 4 shows the initial image of Bf computed under the (incorrect) assumption of no motion. FIG. 5 shows the final image of Bf computed for the motion model, that was determined by the algorithm. In these experiments we used $N_1 = N_2 = N_3 = 4$ (cf. (47)). We used κ=0.0125 to compute edge entropy. At the beginning of iterations (FIG. 4) the value of entropy is 9.81%, and at the end −8.40% (FIG. 5). To illustrate another application of the present invention we use it for solving a misalignment correction problem in the case of a distorted circular scan. Suppose that under the ideal circumstances the source trajectory is a circle. Suppose that because of mechanical instabilities the actual trajectory is a distorted circle given by $$x_1 = R\cos s, \quad x_2 = R\sin s, \quad x_3 = \sum_{n=1}^{N} c_n \cos(ns). \quad \text{Eq. (51)}$$

Here $c_n$, $n=1, 2, \ldots, N$, are unknown and are to be determined from the tomographic data. Suppose, for simplicity, that the detector always contains the $x_3$-axis, its center has the same $x_3$-coordinate as the source, and is perpendicular to the source to center line. Thus, the detector moves along the $x_3$-axis in the same way as the source. It is clear that, similarly to the motion contaminated case, if source trajectory is known with error, the edges spread and the image looks more random. Consequently, the procedure outlined earlier applies here as well (with the optimization of the "motion model" replaced by the optimization of the "trajectory model"). In our numerical experiment we used the same seven-ball phantom as before (only it is not moving now), and took N=5 with $c_1 = c_3 = c_5 = 5$, $c_2 = c_4 = -5$. Other parameters: source to isocenter distance R and size of reconstruction grid are the same as in the first experiment. As initial approximation all $c_i$'s were taken to be zero. Optimization was done using the Nelder-Mead simplex algorithm, see J. Nelder and R. Mead, A simplex method for function minimization, Comput. J., 7 (1965), pp. 308-313. At the end of iterations the computed constants are 3.58, −5.87, 4.81, −5.36, 4.52. Initial entropy was equal 20.1%, and at the end of iterations it was 8.44%. See FIG. 6 for the density plots of Bf.

In the case of noise-free (or low noise) data, the algorithm based on LT as outlined above works well. If data are sufficiently noisy, the proposed scheme is unstable. Indeed, to compute the LT function we differentiate the data two times.

Then, to find bright pixels, we differentiate the image one more time. To make the algorithm more robust observe that instead of $\partial^2/\partial q^2$ in Equation (5) we can use almost any even convolution kernel which preserves singular support. It was found empirically that convolving the tomographic data along data rows with the kernel, whose frequency characteristic is given by $|\lambda|^{0.2}$ produces good results. In FIG. 7, left two columns, we see the LT images and the results of bright pixel detection using the filter $\partial^2/\partial q^2$ in Equation (5) in the case of (erroneous assumption) of zero motion in the data. The right column of FIG. 7 shows the results of bright pixel detection using the new filter. As is seen, the latter is much less noisy than the former. In FIG. 8 we see the reconstructions at the end of iterative motion estimation. Left column shows the intermediate "local" tomography image, middle column shows the results of bright pixel detection. Note that these images are computed from the noisy data in the process of iterations and correspond to the motion model with the least edge entropy. Even though the filter is no longer local, we keep using the name "local tomography" to emphasize the fact that we still do not reconstruct density values (as opposed to conventional "global tomography"). To better illustrate our results we computed the traditional LT function from the noise-free data using the computed motion model, see the right panel. It is clearly seen from these images that the edges are now much less spread than they were at the beginning of iterations.

Discussion.

In this patent application, LT in the motion contaminated case was studied. It is shown that microlocally, away from some critical directions, LT is equivalent to a pseudo-differential operator of order one. LT also produces non-local artifacts that are of the same strength as useful singularities. As opposed to the static case, here it is not possible to choose the direction of differentiation to reduce the strength of the artifact by one order in the scale of Sobolev spaces. On the other hand, if motion is sufficiently small, it is expected that choosing $\Theta$ as in Equation (31) which is analogous to what was done in A. Katsevich, Improved cone beam local tomography, Inverse Problems, 22 (2006), pp. 627-643 (compare Equation (32) with Equation (2.11) in Katsevich (2006)), may help reduce the artifacts. Then we consider the case when motion is not accurately known. It is shown that when a singularity is seen from two different source positions, it spreads in different directions. A single edge becomes a double edge. Based on this observation we propose an algorithm for motion estimation. The algorithm is quite flexible and is used for solving the misalignment correction problem.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A motion estimation method for tomography comprising the steps of:
    (a) collecting tomographic data of an object which undergoes a transformation during a scan;
    (b) reconstructing an image of the original object, wherein information about the object useful for the motion estimation and contained in the image pertains only to one or more edges of the object, whereas the edges are defined as sharp spatial features inside the object;
    (c) using the reconstructed image from step (b) for estimating a transformation of the object during the scan; and
    (d) repeating steps (b) and (c) two or more times for improving the estimate of the transformation, wherein steps (b) and (c) are repeated until a number of edges with a predetermined characteristic are below a preselected threshold.

2. The method of claim 1, wherein step (b) of reconstructing the image of the object comprises the step of:
    using x-rays only passing through a small neighborhood corresponding to each pixel for applying filtering and backprojection to data from the x-rays passing through the neighborhood, wherein a small neighborhood is defined as a region which is smaller than the smallest cross-section of the object.

3. The method of claim 1, wherein using step (c) includes the step of:
    analyzing a spatial distribution of the one or more edges in the reconstructed image as a substep.

4. A motion estimation method for tomography comprising the steps of:
    (a) collecting tomographic data of an object which undergoes a transformation during a scan;
    (b) reconstructing an image of the original object, wherein information about the object useful for the motion estimation and contained in the image pertains only to one or more edges of the object, whereas the edges are defined as sharp spatial features inside the object;
    (c) using the reconstructed image from step (b) for estimating a transformation of the object during the scan, which includes the step of:
    analyzing a spatial distribution of the one or more edges in the reconstructed image as a substep, wherein the step of analyzing the spatial distribution of the edges in the reconstructed image includes the step of:
    using a prevalence of double edges in the reconstructed image for the motion estimation, wherein double edges are defined as edges located close to each other; and
    (d) repeating steps (b) and (c) two or more times for improving the estimate of the transformation, wherein steps (b) and (c) are repeated until a number of edges with a predetermined characteristic are below a preselected threshold.

5. The method of claim 4, wherein step (b) includes the step of:
    assuming a selected model of the transformation that the object is undergoing and using the selected model for the reconstruction.

6. The method of claim 5, further comprising the step of:
    making the conclusion that the assumed model is not an accurate model of the said transformation when a large number of double edges are detected; and
    making the conclusion that the assumed model is an accurate model of the said transformation when a small number of double edges are detected.

7. The method of claim 5, wherein step (b) of reconstructing an image of the object includes the step of: using only x-rays passing through a small neighborhood corresponding to each pixel, wherein a small neighborhood is defined as a region which is smaller than the smallest cross-section of the object.

* * * * *